United States Patent [19]

Bailey et al.

[11] Patent Number: 4,790,969

[45] Date of Patent: Dec. 13, 1988

[54] DRY MOLDED CATHODE COLLECTOR FOR LIQUID CATHODE SYSTEMS

[75] Inventors: John C. Bailey, Columbia Station; Timothy D. Foley, North Olmsted; Ernest D. Botos, Bay Village, all of Ohio

[73] Assignee: Eveready Battery Company, St. Louis, Mo.

[21] Appl. No.: 74,231

[22] Filed: Jul. 16, 1987

[51] Int. Cl.[4] .............................................. H01M 4/00
[52] U.S. Cl. ..................................... 264/105; 429/217
[58] Field of Search ......................................... 264/105

[56] References Cited

U.S. PATENT DOCUMENTS

| | | | |
|---|---|---|---|
| 2,799,053 | 7/1957 | Gartland | 264/105 |
| 3,985,573 | 10/1976 | Johnson et al. | 429/133 |
| 4,020,248 | 4/1977 | Goebel | 429/164 |
| 4,118,334 | 10/1978 | Goebel | 252/182.1 |
| 4,303,604 | 12/1981 | Gilman | 264/105 |
| 4,307,052 | 12/1981 | Gannon et al. | 264/105 |
| 4,536,359 | 8/1985 | Tanaka | 264/105 |

FOREIGN PATENT DOCUMENTS

| | | |
|---|---|---|
| 0118657 | 9/1984 | European Pat. Off. |
| 59-128772 | 7/1984 | Japan. |
| 59-128773 | 7/1984 | Japan. |
| 59-171470 | 9/1984 | Japan. |

OTHER PUBLICATIONS

V. Danel et al., J. Elec. Chem Soc., vol. 83-2, Oct. 1983, Abstract 43.

Primary Examiner—James Derrington
Attorney, Agent, or Firm—Robert W. Welsh

[57] ABSTRACT

Disclosed is a method of forming porous carbon cathode collectors for electrochemical cells by mixing carbon black with binder and liquid to form a dough, drying it at an elevated temperature, compacting the dried mix at an elevated temperature, milling it to a particle size greater than 0.05 mm and preferably 0.1 to 0.3 mm, and molding the dry milled mix, preferably by auger feeding, to form a collector having a pore size at least 50% by volume being 10 microns or larger and most preferably in the range of 10 to 90 microns.

10 Claims, 2 Drawing Sheets

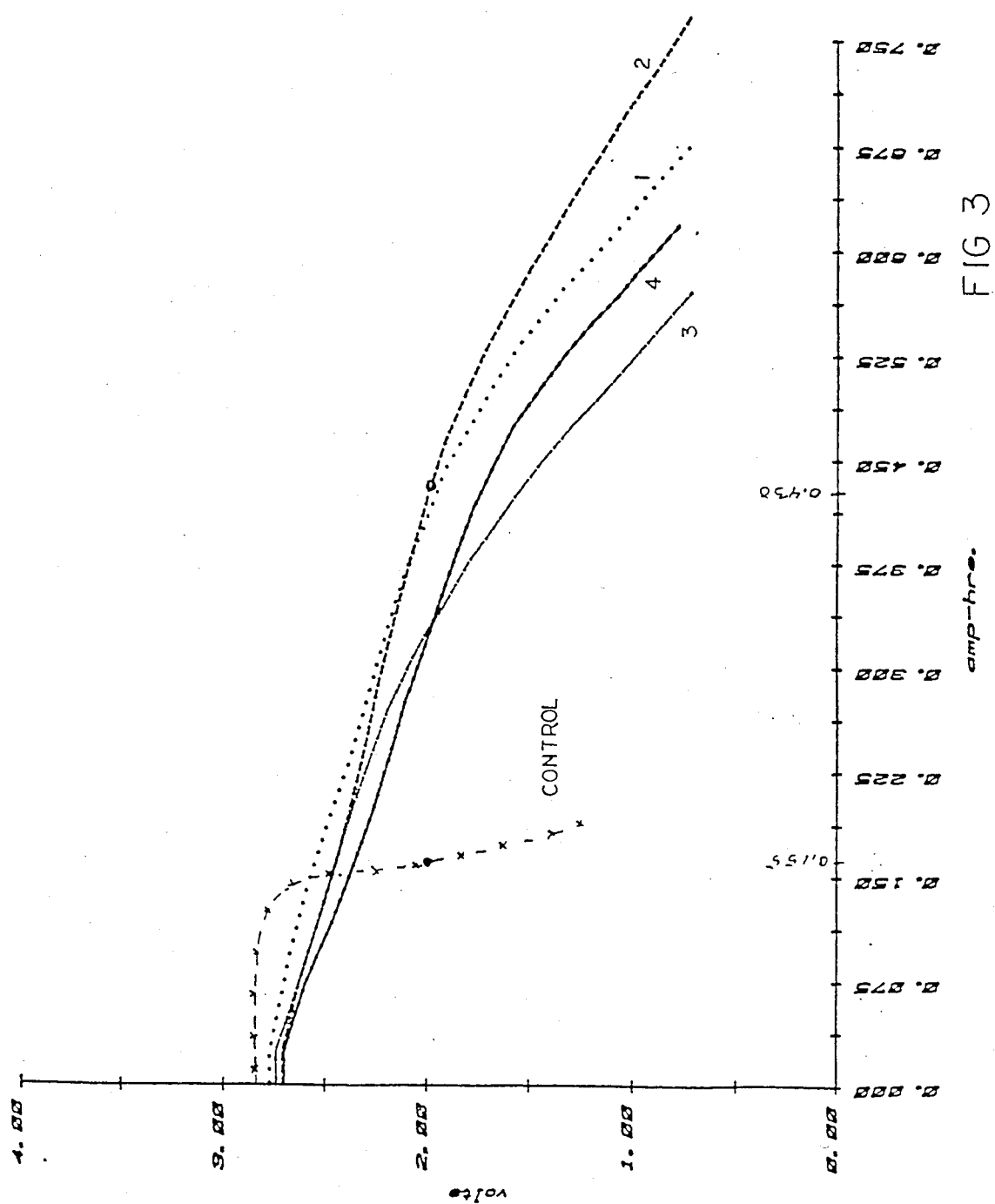

DRY MOLDED CATHODE COLLECTOR FOR LIQUID CATHODE SYSTEMS

BACKGROUND OF THE INVENTION

This invention relates to cathode collectors for liquid cathode electrochemical cells and particularly to a method of forming improved porous carbon cathode collectors as for lithium-thionyl chloride cells.

Liquid cathode cells such as thionyl chloride cells, which utilize molded cathode collectors, are particularly useful when employed at low rates of discharge, i.e. at low cathode current densities. However, such cells exhibit very poor performance at high rates of discharge. The cells typically cease effective function after a relatively short time, when a majority of the anode is still present and the cell is still wet with catholyte (cathode-electrolyte). Consequently, there is considerable waste of active materials resulting, as well as short cell life and the need for frequent replacement of the cells.

By analysis of the problem, the inventors herein suspected that one possible cause of this could be plugging of the cathode collector with solid reaction products. Subsequent experimentation, examination and analysis resulted in the conclusion that the cathode collector regions closest to the anode did exhibit plugging. This was considered to be interfering with cell functioning.

The inventors then conceived and developed a novel method of dry molding a cathode collector with particular pore characteristics resulting in a superior collector resistant to the plugging problem that normally unduly shortens the lifetime of such cells, thus making possible the construction of liquid cathode cells with molded cathode collectors having greatly improved performance at high cathode current densities.

Carbon cathode collectors are typically formed into their molded shapes by wet molding processes which involve forcing an appropriately shaped ram into the wet flowable mix of carbon and binder retained in the cell container, thereby forcing the wet mix to flow up into the space between the ram and the container wall. The mix is then dried. Johnson et al, U.S. Pat. No. 3,985,573, discloses such a method. Johnson et al also suggested (column 8, lines 32–40) the technique of substantial removal of water from a slurry, followed by sintering into a cake, breaking up the sintered cake into fine particles of powder, and molding such into the form of a slotted annular bobbin.

SUMMARY OF THE INVENTION

This invention provides a method of forming porous carbon cathode collectors for liquid cathode-electrolyte cells capable of extending the useful life of liquid cathode-electrolyte cells operating at high rates of discharge. The resultant collectors are resistant to plugging by chemical reaction products as the cell is discharged. This novel method includes mixing the carbon and binder in wet form, drying the mix, compacting the dried mix while at elevated temperature, milling the dry compacted mix to a particular particle size, and press molding the mix in its dry form into a solid porous member with particular pore size characteristics, at least 50% by volume of the pores being 10 microns or larger in size and most preferably at least 50% by volume being in the range of 10–90 microns. The dry mix is fed by means of an auger into the open end of the cell container and then compressed, i.e. press molded by further operation of the auger to form the integral collector. Cells employing the novel collector and discharged at high rates exhibit an electrical output increased about 80% to 200% over that of a prior art cell employing the standard wet molded cathode collector.

BRIEF DESCRIPTION OF THE DRAWINGS

FIG. 3 is a graph depicting the function of four test cells utilizing the invention in comparison with a control cell.

DESCRIPTION OF THE PREFERRED EMBODIMENT

Figure 2:
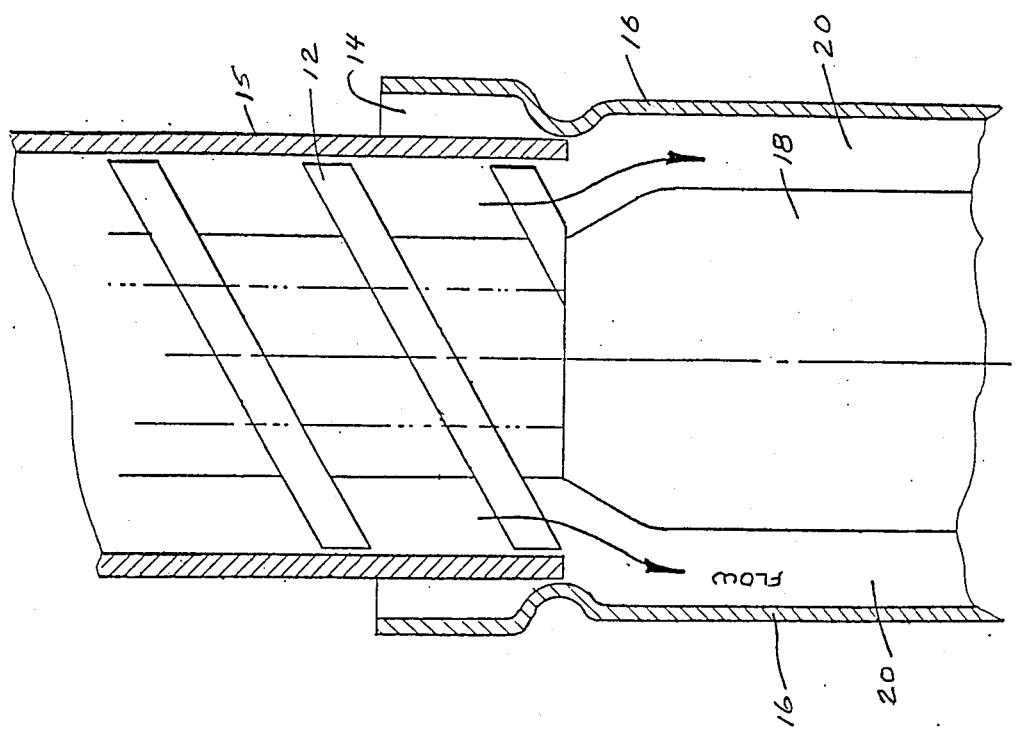
FIG. 2 is an enlarged fragmentary view of a portion of the auger in FIG. 1, with its surrounding horn or sleeve, in combination with a cell container serving as a mold.

Nonaqueous solvent electrochemical cells utilizing liquid cathodes typically include an alkali metal anode such as lithium or the equivalent, a separator, a porous carbon cathode collector and a catholyte (cathode-electrolyte) for example based on thionyl chloride ($SOCl_2$) or the like. The most common physical form of such cells is a cylindrical assembly containing a carbon cathode collector often called a bobbin. This member is an annular element preferably positioned adjacent the container inner wall. The anode is also an annular element and is preferably concentrically positioned within the cathode collector. (If desired, the positions of the two electrodes can be reversed.) These liquid cathode cells exhibit reliable extended performance at low rates of discharge but unfortunately have poor performance at high rates of discharge.

The porous carbon cathode collectors for such liquid cathode systems have generally been produced by wet molding of carbon black with a polymeric binder such as polytetrafluoroethylene. The carbon black and binder are mixed with water to form a wet dough which is placed into the cell container which serves as a mold. The mix is then formed with a cylindrical ram to force the wet material up around the ram into an annular cylindrical shape. Such prior art cathode collectors, made for example in accordance with the teachings in U.S. Pat. No. 3,985,573 by Johnson et al, generally do exhibit high electrical conductivity, high porosity and high surface area. They support a rate of electrochemical reduction (discharge rate) and have a porosity adequate to accommodate many uses of the cell. However, at high rates of discharge, the cell fails when only a fraction of its capacity has been consumed.

According to the present invention, a cathode collector is produced which has demonstrated an improvement in electrical output of 80% to 200% at high discharge rates.

The cathode collector of this invention serves to conduct current to the external positive terminal. Since it is used in conjunction with a liquid active cathode material, it provides reaction sites for the cathodic electrochemical process of the cell. Thus the cathode collector must be an electronic conductor, have sufficient porosity for maintaining accessible reaction sites and be of a material capable of catalyzing or sustaining the cathodic electrochemical process. Materials suitable for use as a cathode collector are carbon materials with acetylene black being preferable. As is known, a binder, with or without plasticizers and with or without stabilizers, is added to the carbon material. This is preferably a fluorocarbon polymer such as a polytetrafluoroethylene or a polychlorotrifluoroethylene. The preferred mechanical binder for utilization in the cathode material of the present invention is a fluorocarbon polymer which is inert in the primary electrochemical cells of the invention. Two examples of preferred fluorocarbon polymers of particular utility in the present invention are those identified by the tradenames Teflon and Kel-F. Teflon is a registered trademark of E. I. du Pont de Nemours and Company for tetrafluoroethylene fluorocarbon polymers and fluorinated ethylene-propylene resins. Kel-F is a registered trademark of the 3M Company for a series of fluorocarbon products including polymers of chlorotrifluoroethylene and certain copolymers. Polytetrafluoroethylene is most preferred. A function of fluorocarbon polymers in the present invention is to stabilize the mechanical strength of the cathode collector by forming chain-like connections between the various particles of carbon to form a mechanical binding network so that a semi-rigid configuration may be achieved for the cathode collector. A specific example of such a polymeric binder is that produced using a fluorocarbon polymer emulsion made by du Pont and designated T-30B.

Other potential binder materials for this purpose would include elastomers such as rubbers, both natural and synthetic, vinyl polymers, polyethylene, polypropylene, acrylic polymers, polystyrene and the like.

The binder is added in an amount between about 5% and about 30% by weight of the molded cathode collector since an amount less than 5% normally does not provide sufficient strength or elasticity to the molded body while an amount larger than 30% tends to wetproof the surface area of the carbon thereby reducing the access to the reaction sites required for the cathodic electrochemical process of the cell. Preferably, the binder is between about 5% and 10% by weight of the collector. The binder material for the cathode collector must be one which is chemically stable in the cell system.

The liquid active reducible cathode materials for use in this invention can be employed by themselves, mixed with a conductive solute which is a non-reactive material but is added to improve conductivity of the liquid active reducible cathode materials, or mixed with both a conductive solute and an electrochemically active or non-reactive cosolvent material. When an electrolyte solvent performs the dual function of acting as solvent for an electrolyte salt and as the active cathode material of the cell, then it is referred to as a "cathode-electrolyte". In a fully assembled cell a liquid cathode, with or without a solute, is added into the cell where it then permeates through the cathode collector and also through the separator to contact the anode of the cell. In addition, the separator could be soaked with the liquid cathode prior to its being assembled in the cell or after it is assembled in the cell. The cell may be constructed so that an axial cavity in the electrode assembly forms a reservoir for the liquid cathode.

Suitable nonaqueous liquid cathode materials for use in this invention could be one or more of the oxyhalides of an element of Group V or Group VI of the Periodic Table and/or one or more of the halides of an element of Group IV to Group VI of the Periodic Table, said Periodic Table being the Periodic Table of Elements as set forth on the inside back cover of the Handbook of Chemistry and Physics, 63rd Edition, The CRC Press, Inc., Boca Raton, Fla., 1982-1983. For example, such nonaqueous cathode materials would include sulfuryl chloride, thionyl chloride, phosphorus oxychloride, thionyl bromide, chromyl chloride, vanadyl tribromide, selenium oxychloride, sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribromide chloride. In addition to the above, liquid sulfur dioxide or liquid halogens (or their solutions) could be used, such as bromine, liquid chlorine or iodine (in solution). Examples of suitable anodes for use in nonaqueous cells would include lithium, sodium, calcium, magnesium, lithium monoaluminide and lithium-magnesium.

The cell container and cover for use in this invention can be made of stainless steel, nickel-clad steel or some other conductive material that will not corrode or otherwise deteriorate when in contact with the liquid cathode materials. Preferably the container and cover are made of 304-stainless steel which has been heat treated to release the inherent stresses introduced during conventional drawing operations. For large cells, the cover of the cell, which serves as one electrode terminal, would usually be in the form of a metallic member having a diameter slightly less than that of the container. An insulating gasket member would then be employed to provide a seal between the cover and the container. For smaller cells, the cover of the container could be in the form of a central metal member embedded in and extending through an insulating disk member, the latter providing a seal between the central metal member, for example a rivet, and the container.

The carbon black can be any of several which are commonly used for forming cathodes or cathode collectors for electrochemical cells such as acetylene black.

The carbon black, Teflon binder and sufficient added water to form the mix into a dough are blended together to provide a uniform mix. This dough is then dried, preferably at an elevated temperature of about 170 degrees C., but not to exceed 300 degrees C., to remove the added water. The dried mix, while still at an elevated temperature below 300 degrees C., is then compacted to densify it and improve the Teflon utilization. The elevated temperature during compaction is preferable in that it is believed that the hot compaction causes the polymer particles to change structure somewhat to achieve a better ultimate product.

After the dry compacted mix has cooled, the densified material is milled to produce a granular flour. The milling operation is conducted only until substantially all of the particles are greater than about 0.05 mm in diameter and preferably are substantially in the range of about 0.1 to about 0.3 mm in diameter. This can be done by milling through a 16 mesh screen in a Fitzpatrick mill. This screen passes particles of about 1.0 mm or less in diameter; however, such milling results in the majority of the particles being greater than about 0.15 mm in diameter, which is the most preferred size.

Figure 1:
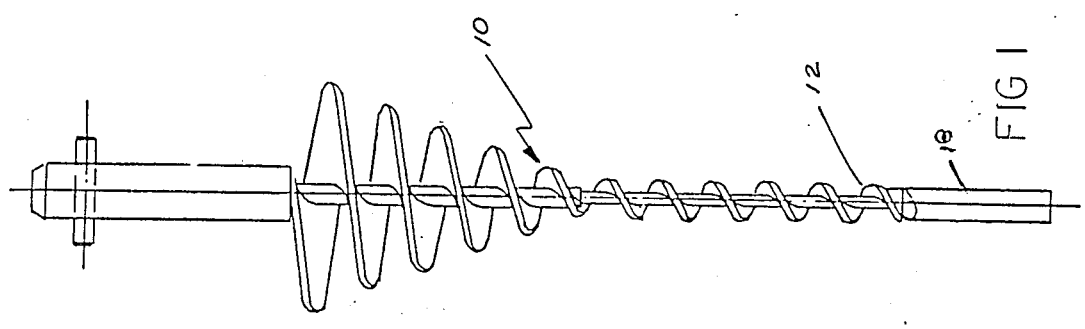
FIG. 1 is an elevational view of an auger useful for practicing this invention.

The dried milled particulate mix is then press molded as by forcing it directly into the container for the electrochemical cell. This is achieved by feeding the dried mix into the container with a helical auger 10 (FIGS. 1 and 2), the helical blade 12 of which terminates just within and adjacent the opening 14 of the container 16. Container 16 serves as a mold. Extending around the helical auger is a horn or sleeve 15 to retain the mix as the auger advances it to the container. Extending downwardly from the lower tip of the auger, beneath the lower end of sleeve 15, is a cylindrical plug 18 that serves as a molding core in the container. It is secured to and rotates with the auger, extending down near the bottom of the container. This core has an outer diameter smaller than the container inner diameter and spaced from the container inner wall, leaving an annular cylindrical molding space. Its outer diameter is equal to the inside diameter of the cathode collector to be formed, with the container having an inside diameter larger than the outside diameter of the collector, and the auger blade thus forces the dry mix down into the annular cylindrical cavity 20, pressing it in position by continued operation of the auger for achieving the press molding action. The formed cathode collector has a resultant porosity of about 80% up to 90% by volume, with at least 50% by volume of the pores being 10 microns or larger in size. It is desired to have at least about 39% by volume of the pores constitute individual pores about 26 microns or larger in diameter. At least about 40% by volume of the pores constitute pores in the range of about 10 to about 100 microns in diameter and preferably 10 to about 90 microns in diameter.

EXAMPLE

A series of five cells was produced. Four of these cells had cathode collector manufactured using the teachings of this invention. The fifth cell, a control cell, employed a cathode collector manufactured using conventional wet molding technology. The remaining components of all five cells were alike, including lithium anodes, a solution of 1.5 M LiAlCl$_4$ in thionyl chloride as the cathode-electrolyte and stainless steel containers and covers.

The four cathode collectors were prepared by mixing carbon black and polytetrafluoroethylene particles (in the form of an aqueous emulsion) with enough water to form a doughy mix, and blending them into a uniform dough. This mix was dried at about 170 degrees C. until substantially all of the added water was removed. The hot dough was then compacted by rolling to densify it, (using a roll pressure of 1500 psi) and to improve the cohesive nature of the mix. The compacted dry mix was then cooled to ambient temperature and subsequently milled using a conventional Fitzpatrick mill and a 16 mesh screen which has openings of about 1.0 mm diameter. The powder was sifted on an Allen-Bradley sonic sifter, with about 90% of the mix particles remaining on a 100 mesh screen (orifice size of 0.15 mm). The milled dry mix was then fed by the auger in FIGS. 1 and 2 into the container, causing the mix to take the form of an annular cylinder around the cylindrical extension from the auger. The mix was also press molded by the rotating auger, resulting in a cathode collector having a total porosity of about 90%, with substantially all of the pores being greater than 0.1 micron in diameter and 39% by volume of the pores being greater than 26 microns in diameter.

The five cells were discharged under a 5-ohm load. The results are graphically displayed in FIG. 3, with the contrast being striking. The control cell delivered only 0.155 Ah to a 2.0 volt cutoff compared, for example, to 0.430 Ah for cell 2. All four of the novel cells showed marked improvement in performance over the control cell.

Various details of the invention could be modified as desired, without departing from the inventive concept. Therefore, the invention is intended to be limited only by the scope of the appended claims and the reasonable equivalents thereto.

The embodiments of the invention in which an exclusive property or privilege is claimed are defined as follows:

1. A method of forming porous carbon cathode collectors for electrochemical cells comprising the steps of:
   mixing carbon black and binder with sufficient added liquid to obtain effective distribution of the binder with the carbon black in the form of a dough;
   drying the dough mix to remove the added liquid;
   compacting by rolling to improve the cohesive nature of the dry mix while at an elevated temperature less than about 300 degrees C.;
   milling the dry compacted mix of carbon black and binder only until substantially all of the particles are greater than about 0.05 mm in diameter; and
   press molding the dry milled mix into a resultant porous collector with at least 50% by volume of the pores being 10 microns or larger in size.

2. The method in claim 1 wherein said drying step includes elevating the temperature of said mix to less than about 300 degrees C., and said compacting step is performed while the temperature is still elevated.

3. The method of claim 1 wherein said step of milling is conducted until the particles are substantially in the range of about 0.1 to about 0.3 mm in diameter.

4. The method in claim 1 wherein said press molding step is performed until at least about 39% by volume of the pores constitutes pores about 26 microns or larger in diameter.

5. The method in claim 1 wherein said press molding step is performed until at least about 40% by volume of the pores constitutes pores in the range of about 10 to about 100 microns in diameter.

6. The method in claim 1 wherein said press molding step is performed until at least about 50% by volume of the pores constitutes pores in the range of about 10 to about 90 microns in diameter.

7. The method in claim 1 wherein said press molding step is performed by auger feeding said milled mix into a cylindrical mold cavity between an outside mold and an inside core and pressing the molded mix with further auger feeding.

8. The method in claim 1 wherein said collector is molded to a final porosity of about 80 to 90% by volume.

9. A method of forming porous carbon cathode collectors for electrochemical cells comprising the steps of:
   mixing carbon black and binder with sufficient added liquid to obtain effective distribution of the binder with the carbon black in the form of a dough;
   drying the dough mix to remove the added liquid at an elevated temperature less than about 300 degrees C.;
   compacting by rolling to improve the cohesive nature of the dry mix while still at an elevated temperature less than about 300 degrees C.;
   milling the dry compacted mix of carbon black and binder only until the particles are substantially in the range of about 0.1 to about 0.3 mm; and
   press molding by auger feeding the dry milled mix to form a resultant porous collector with at least 40% by volume of the pores being in the range of about 10 microns to about 100 microns in diameter, and having a porosity of about 80% to 90% by volume.

10. The method in claim 9 wherein said press molding step is performed until at least about 50% by volume of the pores constitutes pores in the range of about 10 to about 90 microns in diameter.

* * * * *